United States Patent Office 3,541,145
Patented Nov. 17, 1970

3,541,145
HERBICIDE COMPOSITIONS
Jan Johannes van Daalen, Jasper Daams, and Johannes Wijma, Weesp, Netherlands, assignors, by mesne assignments, to U.S. Philips Corporation, New York, N.Y., a corporation of Delaware
No Drawing. Filed Jan. 2, 1968, Ser. No. 694,975
Claims priority, application Netherlands, Jan. 3, 1967, 6700027
Int. Cl. C07c *153/05*
U.S. Cl. 260—551    16 Claims

ABSTRACT OF THE DISCLOSURE

Low volatile derivatives of the herbicidal compound 2,6-dichlorobenzonitrile are produced by reacting 2,6-dichlorothiobenzamide with an aliphatic or aromatic aldehyde and reacting the resultant product with either a second molecule of the thiobenzamide, an aliphatic or aromatic thioamide or an aliphatic carbonitrile. The resultant product is decomposed in the soil to form 2,6-dichlorobenzonitrile.

---

The invention relates to compounds converted in the soil into 2,6-dichlorobenzonitrile. The 2,6-dichlorobenzonitrile is a known compound affecting the growth of plants and is employed as the active constituent in herbicidal compositions.

The use of 2,6-dichlorobenzonitrile in herbicide compositions involves a disadvantage due to the comparatively high volatility of 2,6-dichlorobenzonitrile, which is undesirable for certain forms of compositions.

The applicants have found that it is possible by choosing suitable reaction constituents, including a compound converted in the soil into 2,6-dichlorobenzonitrile, to compose substances having a comparatively slight volatility, and, in addition, a satisfactory herbicidal activity, since the resultant compounds are decomposed in the soil to form 2,6-dichlorobenzonitrile.

According to the invention it has been found that this result can be otbained by reacting an aliphatic or aromatic aldehyde, which may be substituted, with 2,6-dichlorothiobenzamide and with either a second molecule of this thiobenzamide or with a substituted or non-substituted aliphatic or aromatic thioamide or with a substituted or non-substituted aliphatic carbonitrile.

In particular the compounds according to the invention are produced by reacting 2,6-dichlorothiobenzamide in the presence of a strong acid with a compound of the formula:

$$R_1-\underset{\underset{O}{\|}}{C}-H$$

wherein $R_1$ is a hydrogen atom or a hydrocarbon group having 1 to 6 carbon atoms, which may be substituted with 1 to 3 halogen atoms, nitro-, hydroxyl- and/or cyano-groups, while the intermediate reaction product is reacted simultaneously or subsequently with a compound of the formula

wherein:

$R_2$ is a hydrocarbon group having 1 to 6 carbon atoms, which may be substituted with 1 to 3 halogen atoms, nitro-, hydroxyl- or cyano-groups, an amino-group or a mono- or dialkyl substituted amino group in which the alkyl group has 1 to 6 carbon atoms and whereby the latter group may form a ring structure and $R_3$ is an alkyl-group having 1 to 6 carbon atoms, which may be substituted with 1 to 3 halogen atoms, nitro-, hydroxyl- and/or cyano-groups, after which the compound may be separated out of the salt.

The reactions may be carried out with the reaction constituents as such, but it is to be preferred to have the reactions performed in an inert solvent.

Suitable solvents are, for example, aliphatic hydrocarbons, such as petroleum-ether, hexane, heptane, octane, the aromatic hydrocarbons such as benzene, toluene, xylene, ethers such as diethylether, diisopropylether and various other organic solvents such as acetone, chloroform, dioxane or carbontetrachloride. Preferably dioxane or an aromatic hydrocarbon, particularly, toluene, is used as a solvent. The reactions may be carried out at room temperature or by heating the reaction mixture, in which case the highest temperature is the boiling point of the reaction mixture. The reactions have to take place in an acidic medium.

In order to obtain an acidic medium a strong acid, for example, a strong inorganic acid such as hydrochloric acid or sulphuric acid is added to the reaction mixture. Since water is developed during the reactions, it is desirable to minimize the water concentration in the reaction mixture, the acid being therefore added as such (for example hydrochloric acid gas) or in a concentrated solution.

The water produced in the reaction mixture may, if desired, be bound by means of an inert water-binding substance such as $Na_2SO_4$.

After the reaction of the 2,6-dichlorothiobenzamide with the aldehyde the resultant reaction product may be isolated and then reacted wtih a compound of the formulae

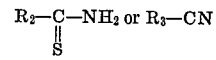

It is also possible to carry out the two reactions without separating out the intermediate product, in which case after the termination of the first reaction a compound of the formulae

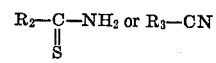

is added to the reaction medium or the two reactions are performed simultaneously by adding both the aldehyde and the compound of the formula

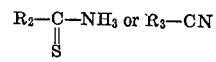

simultaneously or substantially simultaneously to the starting product, i.e. 2,6-dichlorothiobenzamide.

If 2,6-dichlorothiobenzamide is reacted with a compound of the formula

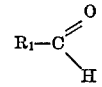

and a compound of the formula

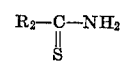

compounds of the structure

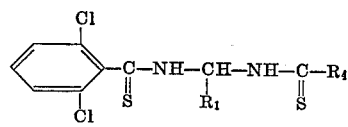

or of the structure:

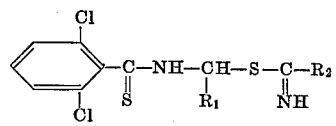

are obtained, in which formulae $R_1$ and $R_2$ have the aforesaid meanings and $R_4$ is a hydrocarbon group having 1 to 6 carbon atoms, which may be substituted with 1 to 3 halogen atoms, nitro-, hydroxyl- and/or cyano-groups.

The resultant structure depends intimately upon the identity of $R_1$ and $R_2$. If $R_1$ is a group comprising a phenyl nucleus and $R_2$ is not an amino-group or a substituted amino-group, compounds of the structure I are obtained, whereas, if $R_1$ does not comprise a phenyl nucleus, compounds of the structure II are obtained, which, if $R_2$ is a hydrocarbon group having 1 to 6 carbon atoms, which may be substituted with 1 to 3 halogen atoms, nitro-, hydroxyl- or cyano-groups, can be converted by heating into corresponding compounds of the structure (I).

In the reaction of 2,6-dichlorothiobenzamide with a compound of the formula $$R_1-C\underset{H}{\overset{O}{\diagup\!\!\!\diagdown}}$$

and a compound of the formula $R_3$—CN, compounds of the formula $$\underset{Cl}{\overset{Cl}{\bigcirc}}\!\!-\underset{S}{\overset{\|}{C}}-NH-\underset{R_1}{\overset{|}{CH}}-NH-\underset{O}{\overset{\|}{C}}-R_3$$

are obtained subsequent to hydrolysis of the reaction mixture, in which formulae $R_1$ and $R_3$ have the aforesaid meanings.

The hydrolysis is carried out in known manner. For example, an aqueous solution of an inorganic acid such as HCl and $H_2SO_4$, a Lewis acid such as $BF_3$ and $AlCl_3$ or an organic acid such as acetic may be added to the reaction mixture, after which the hydrolysis is performed quantitatively by heating.

The compounds according to the invention are chemical substances of the formula:

$$\underset{Cl}{\overset{Cl}{\bigcirc}}\!\!-\underset{S}{\overset{\|}{C}}-NH-\underset{R_1}{\overset{|}{CH}}-X$$

as well as the salts and crystallization adducts thereof, in which formula:

$R_1$ is hydrogen atom or a hydrocarbon group having 1 to 6 carbon atoms, which may be substituted with 1 to 3 halogen atoms, nitro-, hydroxyl- and/or cyano-groups, and X is a group $$R_2-\underset{NH}{\overset{\|}{C}}-S-$$

or $$R_3-\underset{O}{\overset{\|}{C}}-NH-$$

or $$R_4-\underset{S}{\overset{\|}{C}}-NH-$$

in which groups $R_2$ and $R_3$ have the aforesaid meanings and $R_4$ is a hydrocarbon group with 1 to 6 carbon atoms, which may be substituted with 1 to 3 halogen atoms, nitro-, hydroxyl- and/or cyano-groups, on the understanding that, if $R_1$ comprises a phenyl nucleus, X is a group $$R_3-\underset{O}{\overset{\|}{C}}-NH-$$

or a group $$R_4-\underset{S}{\overset{\|}{C}}-NH-$$

The compounds according to the invention may be employed in compositions for combatting undesirable plant growth and have an activity both in pre-emergence treatment and in post-emergence treatment of weeds.

From the research leading up to the present invention it has been found that particularly compounds in which $R_1$ is a hydrogen atom and X is a group:

$$-S-\underset{NH}{\overset{\|}{C}}-NH_2'$$

$$-NH-\underset{O}{\overset{\|}{C}}-alk,$$

$$-NH-\underset{S}{\overset{\|}{C}}-\bigcirc_{Y(n)}$$

or $$-S-\underset{NH}{\overset{\|}{C}}-\bigcirc_{Y(n)}$$

is, in which groups Alk is an alkyl-group having 1 to 6 carbon atoms and Y is a halogen atom, a nitro-, hydroxyl- or a cyano-group, but preferably a halogen atom and particularly a chlorine atom, $n=0$, 1, 2 or 3 and compounds in which $R_1$ is an alkyl-group having 1 to 6 carbon atoms and X is a group $$S-\underset{NH}{\overset{\|}{C}}-\bigcirc_{Y(n)}$$

wherein Y has the aforesaid meaning and, moreover, compounds in which $R_1$ is a group $$-\bigcirc_{Z(n)}$$

and X is a group $$-NH-\underset{S}{\overset{\|}{C}}-\bigcirc_{Y(n)}$$

in which groups Y and Z are halogen atoms, nitro-, hydroxyl- or cyano-groups, but preferably halogen atoms, particularly, chlorine atoms, and $n=0$, 1, 2 or 3 are active.

In the above-mentioned compound, a hydrocarbon group of 1 to 6 carbon atoms includes alkyls such as methyl, n-ethyl, butyl, isopropyl, and hexyl, alicyclic radicals such as cyclobutyl, cyclohexyl and cyclopentyl, cyclohexadieyl 1,3 and cyclopentadieyl, 1,3 alkenyls such as allyl, vinyl and isopropenyl and phenyl. All of these may be unsubstituted or substituted with one or up to three substituents selected from the group consisting of nitro, hydroxyl, cyano and halogen groups.

In all of the above cases the term "halogen" includes fluorine, chlorine, bromine and iodine, chlorine being preferred.

Some of the specific examples of the compounds of the invention are:

I $\quad \underset{Cl}{\overset{Cl}{\bigcirc}}\!\!-\underset{S}{\overset{\|}{C}}-NH-CH_2-S-\underset{NH}{\overset{\|}{C}}-NH_2$ II $\quad \underset{Cl}{\overset{Cl}{\bigcirc}}\!\!-\underset{S}{\overset{\|}{C}}-NH-CH_2-S-\underset{NH}{\overset{\|}{C}}-\underset{Cl}{\overset{Cl}{\bigcirc}}$

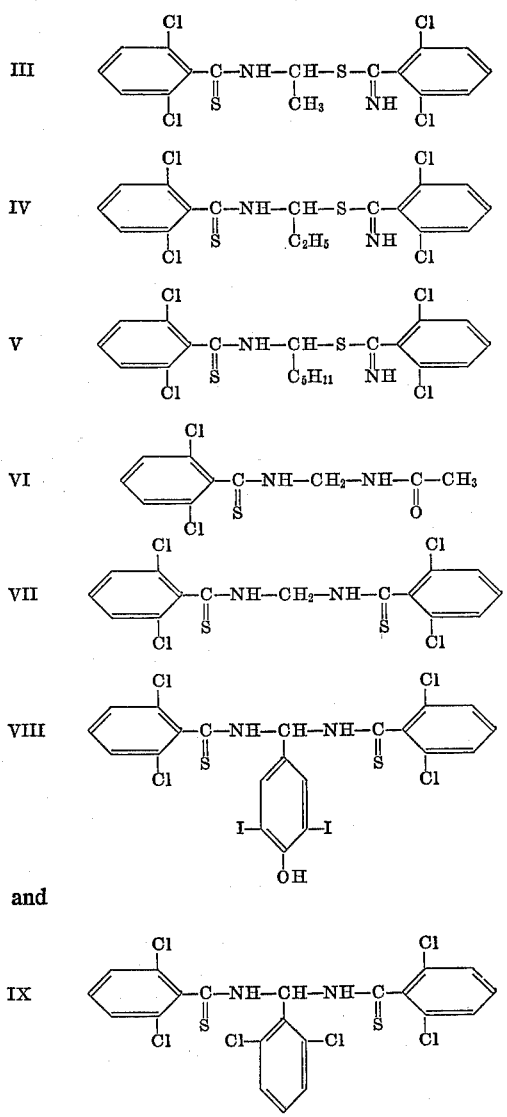

and

The pre-emergence effect of the compounds according to the invention has been found inter alia in a series of tests in which various weed seeds for example seeds of Galium aparine, Senecio vulgaris, Alopecurus agrestis, Matricaria inodora, Stellaria media and Avena fatua were treated with aqueous solutions of various compounds according to the invention in doses corresponding to 1.3 or 5 kgs. of active substance per hectar.

A few weeks after the treatment of the seeds by the compounds according to the invention it was checked whether and to what percentage the seeds had germinated. The tests were carried out under moist and dry conditions. The tests have shown that the following compounds of the invention:

S-(2,6-dichlorothiobenzamido-methylene)-2,6-dichloro-isothiobenzamido-hydrochloride,
S-(2,6-dichlorothiobenzamidomethylene)-2,6-dichloro-isothiobenzamide,
S-{2,6-dichlorothiobenzamido-(methyl)-methylidine}-2,6-dichloroisothiobenzamido-hydrochloride,
S-{2,6-dichlorothiobenzamido-(ethyl)-methylidene}-2,6-dichloroisothiobenzamido-hydrochloride,
S-{2,6-dichlorothiobenzamide-(1-n-pentane)-methylidene}-2,6-dichloroisothiobenzamido-hydrochloride,
N-isothiouroniummethyl-2,6-dichlorothiobenzamido-hydrochloride,
N-acetoamidomethyl-2,6-dichlorothiobenzamide,
Bis-2,6-dichlorothiobenzamidomethane,
N-{2,6-dichlorothiobenzamido-(2,6-dichlorophenyl)-methylidine}-2,6-dichlorothiobenzamide,
N-{2,6-dichlorothiobenzamide-(4-OH-3,5-diiodophenyl)-methylidene}-2,6-dichlorothiobenzamide, had a very satisfactory pre-emergence activity and even with a dose of 1 kg./hectar they produced inhibition of germination from 80 to 100%.

The post-emergence effect of compounds according to the invention was found in a series of tests in which various weeds such as Avena fatua, Stellatia media, Sinapis arvensis and Amarantus retroflexus were sprayed with an aqueous dispersion of the active compounds also in doses of 1.3 or 5 kgs./hectar. This series of tests showed that the compounds according to the invention have an interesting effect on young and adult plants, while particularly S-{2,6-dichlorothiobenzamido-(methyl)-methylidine}-2,6-dichloroisothiobenzamido-HCl and S - {2,6-dichlorothiobenzamido-(ethyl)-methylidine}-2,6-dichloroisothiobenzamido-HCl had a satisfactory post-emergence effect. Furthermore it was found that the compounds according to the invention are not harmful to woody vegetation and can be employed, inter alia, in the selective combatment of weeds in arbori-cultures, for example the combatment of weeds in orchards.

The compounds according to the invention may, if desired, be employed in conjunction with other active herbicidal compounds in a composition suitable for combating weeds, for example in the form of a dust, a wettable, a smoke generator, miscible oil, granul, solution or dispersion.

Herbicides suitable for use together with the compounds according to the invention in herbicidal compositions, are, for example, growth herbicides such as:

2,4-dichlorophenoxy-acetic acid,
2,4,5-trichlorophenoxy-acetic acid,
2-methyl-4-chlorophenoxy-acetic acid,
-(2-methyl-4-chlorophenoxy)-propionic acid, Quaternary herbicides such as:

1-1′-ethylene-2,2′-dipyrridilium-dibromide,
1-1′-dimethyl-4-4′-dipyrridilium-dibromide.

Triazines such as:

2-chloro-4,5-bisethylamino-s-triazine,
2-chloro-4-ethylamino-6-isopropylamino-s-triazine,
2-chloro-4,6-bisisopropylamino-s-triazine;

Urea derivatives such as:

1-phenyl-3,3-dimethylurea,
1-(4′-chlorophenyl)-3,3-dimethylurea,
1-(4′-chlorophenyl)-3-methoxy-3-methylurea,
1-(4′-chlorophenyl)-3-[3-(butyn-1)]-3-methylurea,
1-(4′-bromophenyl)-3-methoxy-3-methylurea,
1-(3′,4′-dichlorophenyl)-3,3-dimethylurea,
1-(3′,4′-dichlorophenyl)-3-methoxy-3-methylurea,
1-(3′-chloro-4′-bromophenyl)-3-methoxy-3-methylurea,
1-(3′-trifluormethylphenyl)-3,3-dimethylurea,
1-[6(4′-chlorophenoxy)-phenyl]-3,3-dimethylurea;

Phenols such as:

2,6-dichloro-4-cyanophenol,
2,6-dibromo-4-cyanophenol,
2,6-diiodo-4-cyanophenol,
4,6-dinitro-orthocresol,
2-sec.butyl-4,6-dinitrophenol,
Pentachlorophenol;

Chlorinated fatty acids such as:

Monochloro-acetic acid,
Trichloro-acetic acid,
α,α-Dichloropropionic acid,
α,α,β-Trichloropropionic acid;

and furthermore:

3-amino-1,2,4-triazole,
3,6-endoxohexahydrophthalic acid,
Maleic acid hydrazide,
2,3,6-trichlorobenzoic acid,
2-methoxy-3,6-dichlorobenzoic acid,
1-(3'-4'-dichlorophenyl)-3-methyl-2-pyrrolidinone,
1-(3'-chloro-4'-methylphenyl)-3-methyl-2-pyrrolidinone,
N,N-dimethyl-2,2-diphenylacetamide,
2,3,5-trichloropyridone-4,
4-amino-3,5,6-trichloro-α-picolinic acid,
5-amino-4-chloro-2-phenyl-3-(2H)-pyridazinone,
3-cyclohexyl-5,6-trimethylenuracyl,
2,6-dinitro-N,N-dipropyl-α,α,α-trifluoro-p-toluidine,
3-isopropyl-5-bromo-6-methyluracil,
3-amino-2,5-dichlorobenzoic acid,
2,3,6-trichlorophenyl-acetic acid,
2,6-dichloro-3-methoxybenzoic acid, and
(3-chlorophenyl)-isopropylcarbamate.

The herbicidal compositions mentioned above are produced by dissolving or mixing one or more compounds according to the invention in or with respectively solid or liquid carriers, if desired with the addition of surface-active substances, adhesives, dispersion agents, emulsifiers and wetting agents. Solid carriers are, for example, the natural minerals such as dolomite, clay, lime, attapulgite and the synthetically produced carriers such as synthetic calcium silicate. Liquid carriers are, for example, toluene, xylene, aliphatic, alicyclic and aromatic ketones such as acetone, methylethylketone, cyclohexanone or mixtures thereof with hydrocarbons.

The invention will be described more fully with reference to a few embodiments.

I.—EXAMPLES OF PRODUCTION (1)

S-(2,6-dichlorothiobenzamido-methylene)-2,6-dichloroisothiobenzamido-hydrochloride (a)

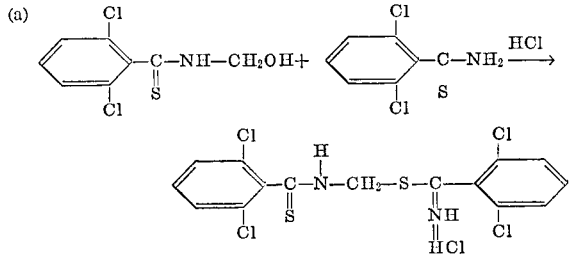

HCl gas was passed for 1.5 hours at 30° C. through a solution of 4.72 g. (0.02 mol) of N-hydroxymethyl-2,6-dichlorothiobenzamide and 4.12 g. (0.02 mol) of 2,6-dichlorothiobenzamide in 100 ml. of benzene.

Then this process was continued for half an hour at 50 to 60° C. During the reaction the mixture was stirred. The precipitated product was filtered off and dried in vacuo. Yield 9.21 g. (100%). Melting point 176–179° C. (decomposition).

(b)

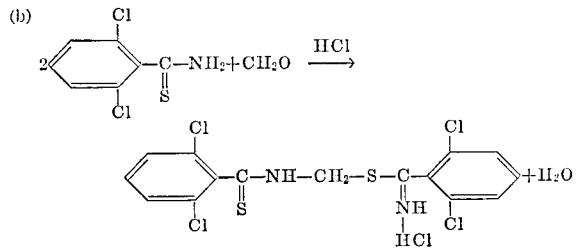

10.3 g. (0.05 mol) of 2,6-dichlorothiobenzamide was dissolved by heating to 50–60° C. in 125 ml. of benzene. Then HCl-gas was passed through and 0.75 g. (0.025 mol) of paraformaldehyde was added. The paraform dissolved soon. Shortly thereafter the product started settling. The reaction carried out while stirred and HCl-gas was passed through for 1.5 hours. The reaction mixture was cooled and filtered off. The product was heated in vacuo at 80 to 100° C. for 2.5 hours. Yield 10.4 g. (96%). Melting point 175–176° C. (decomposition).

EXAMPLE 2

S-(2,6-dichlorothiobenzamidomethylene)-2,6-dichloroisothiobenzamide

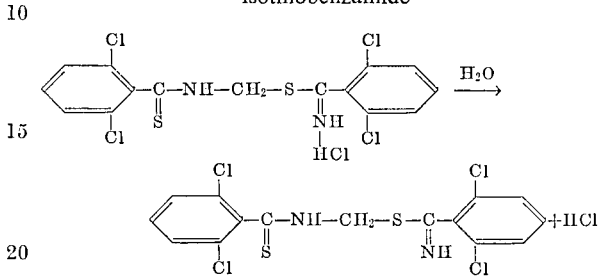

10.0 g. (0.02 mol) of s-(2,6-dichlorothiobenzamidomethylene)-2,6-dichloroisothiobenzamido-hydrochloride was stirred at room temperature for 2.5 hours with 200 ml. of water. The solid substance was sucked off and dried in a vacuum exsiccator above $CaCl_2$. The yield was 7.7 g. (92%). Melting point 120–122° C.

EXAMPLE 3

S-(2,6-dichlorothiobenzamido(methyl)-methylidine)-2,6-dichloroisothiobenzamido-hydrochloride

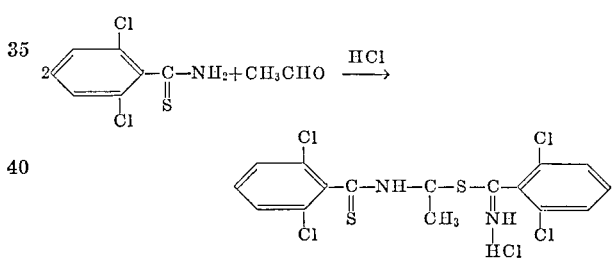

HCl gas was passed for 2 hours through a solution of 4.12 g. (0.02 mol of 2,6-dichlorothiobenzamide and 0.46 g. (0.01 mol) of acetaldehyde in 150 ml. of benzene while stirring.

The temperature was kept below 30° C. The product was filtered off and dried. Yield 4.45 g. (94%). Melting point 140–144° C. (decomposition).

EXAMPLE 4

S-(2,6-dichlorothiobenzamido-(ethyl)-methylidine)-2,6-dichloroisothiobenzamido-hydrochloride

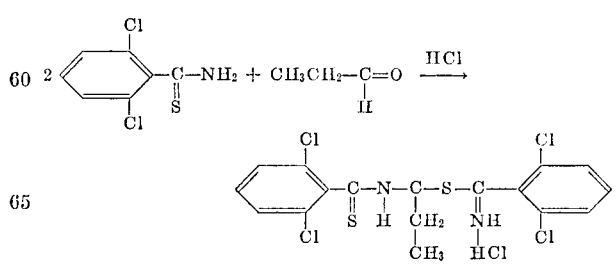

HCl gas was passed through a solution of 16.5 g. (0.08 mol) of 2,6-dichlorothiobenzamide and 2.90 ml. (0.04 mol) of propanol in 500 ml. of benzene while stirring, at 20 to 30° C. for 1.5 hours. After the reaction mixture had been left standing for one hour, it was filtered off. Yield 17.7 g. (91%). Melting point 149–151° C. (decomposition).

EXAMPLE 5

S - (2,6-dichlorothiobenzamido(1 - n-pentane) - methylidene)-2,6-dichloroisothiobenzamido-hydrochloride

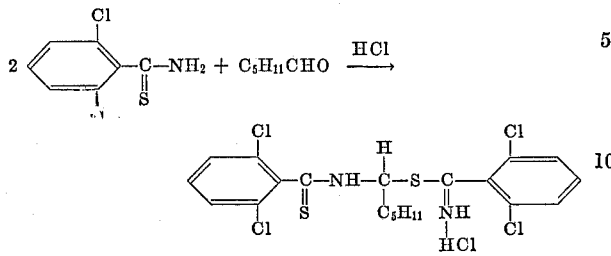

HCl gas was passed through a solution of 32.1 g. (0.156 mol) of 2,6-dichlorothiobenzamide and 15.6 g.=18.5 ml. (0.0156 mol) of hexaldehyde in 2 litres of dry benzene, to which a few grams of $Na_2So_4$—O aq. were added at room temperature of 1¼ hours while stirring. Then 32.1 g. (0.156 mol) of 2,6-dichlorothio-benzamide was again added. The reaction mixture was stirred until the whole addition was dissolved. HCl-gas was then passed through for another ¼ hour. Stirring was stopped and after some time the benzene layer in which the product floated was decanted from the $Na_2So_4$. The mixture was then stirred again for half an hour. After 16 hours the product was filtered off. Yield 62 g. (75%). Melting point 107–112° C. (decomposition).

EXAMPLE 6

Bis-2,6-dichlorothiobenzamido-methane

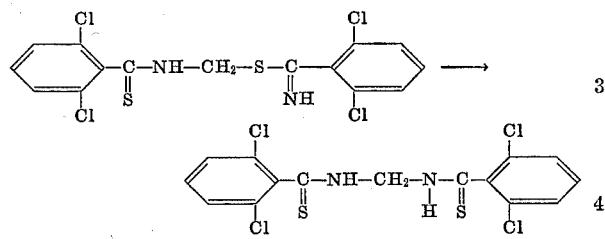

A concentrated solution of S - (2,6-dichlorothiobenzamidomethylene)-2,6 - dichloroisothiobenzamide in 200 ml. of toluene was boiled for 4½ hours with refluxing. The solution was filtered and then cooled to room temperature. The product crystallized out and was filtered off. Yield 13.5 g. (67.5%). Melting point 228–233° C.

EXAMPLE 7

N - (2,6-dichlorothiobenzamido-(4-OH, 3,5- diiodophenyl)-methylidene)-2,6-dichlorothiobenzamide

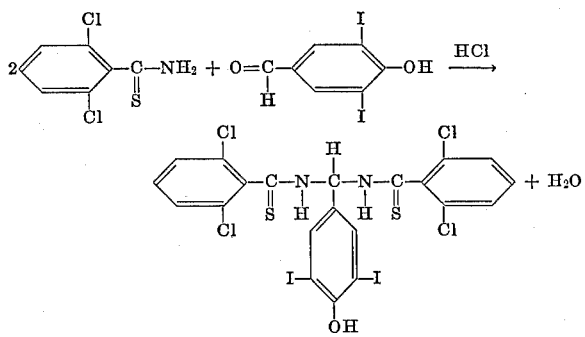

HCl gas was passed, at intervals, through a solution of 16.48 g. (0.08 mol) of 2,6-dichlorothiobenzamide and 14.8 g. (0.04 mol) of 3,5-diiodo-4-hydroxybenzaldehyde in about 450 ml. of benzene. The total duration of the reaction was about 100 hours during which for about 30 hours HCl gas was fed into the solution. The reaction temperature was maintained at about 40° C. The precipitated product was filtered off. Yield 14.6 g. (47.5%). Melting point 205–206° C. (decomposition).

EXAMPLE 8

N - (2,6-dichlorothiobenzamido - 2,6-dichlorophenyl)-methylidine)-2,6-dichlorothiobenzamide

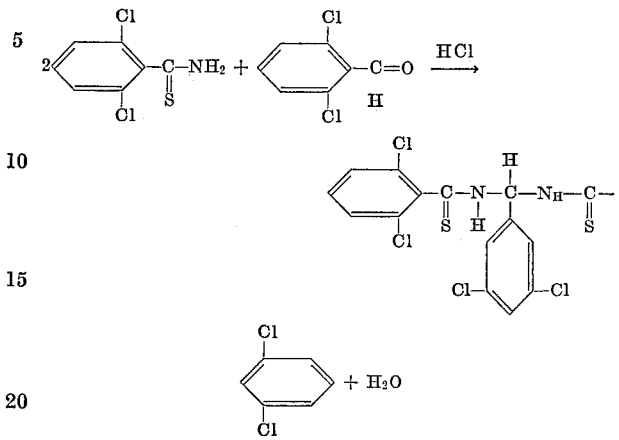

HCl gas was passed through a solution of 6.18 g. (0.03 mol) of 2,6-dichlorothiobenzamide and 2.62 g. (0.015 mol) of 2,5-dichlorobenzaldehyde in about 70 ml. of benzene for 2.5 hours. The temperature was kept near boiling point. Subsequently, the mixture was inspissated to about 50 ml. By cooling to 0° C. the product crystallized out. Yield 3.02 g. (35%). Melting point 104–106° C. (decomposition).

EXAMPLE 9

N-isothiouroniummethyl-2,6-dichlorothiobenzamide-HCl

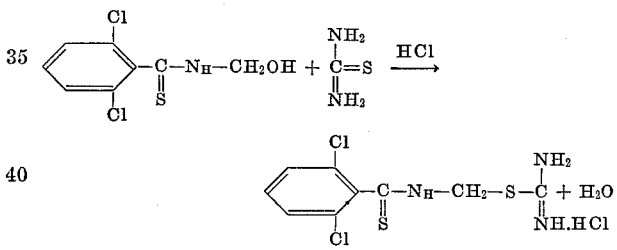

HCl gas was passed through a solution of 21.24 g. (0.09 mol) of N-hydroxymethyl-2,6-dichlorothiobenzamide and 6.84 g. (0.09 mol) of thiourea in 180 ml. of dioxane plus 30 ml. of water at 40 to 50° C. for 5 hours.

Subsequently, the reaction mixture was evaporated to dryness at a reduced pressure. The residue was crystallized from about 200 ml. of n-butanol. Yield 14.9 g. (50%). Melting point 184–186° C. (decomposition).

EXAMPLE 10

N-acetamidomethyl-2,6-dichlorothiobenzamide

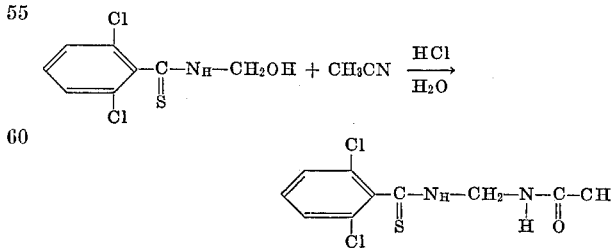

A solution of 4.80 g. (0.023 mol) of N-hydroxymethyl-2,6-dichlorothiobenzamide in 20 ml. of acetonitrile was saturated with HCl-gas. After 2.5 hours the solution was filtered and then boiled for 3 hours with 20 ml. of acetic acid. The reaction mixture was then kept at room temperature for 20 hours and then poured out in about 150 g. of ice water. The crystalline precipitate was filtered off and dried.

The crude product was crystallized from isopropanol. Yield 1.67 g. (26%).

EXAMPLE 11

Production of herbicidal compositions.—A dust was made by mixing 5 parts by weight of active substance with 95 parts by weight of dolomite and by grinding the mixture.

EXAMPLE 12

A wettable powder was obtained by mixing 50 parts by weight of the active substance with 3 parts by weight of oleylamidomethyllaurate, 10 parts by weight of sodium-ligninosulphonate and 37 parts by weight of kieselguhr and by grinding the resultant mixture.

EXAMPLE 13

A miscible oil was made by dissolving 10 parts by weight of the active substance and 5 parts by weight of a mixture of polyoxyethylenesorbitanlaurate and calcium-dodecylbenzenesulphonate in 40 parts by weight of xylene and 45 parts by weight of dimethylformamide.

EXAMPLE 14

Example of spraying.—8 kg. of a wettable containing 4 kg. of S-2,6-dichlorothiobenzamido-(methyl)-methylene-2,6-dichloroisothiobenzamido-hydrochloride, 250 g. of oleylamidomethyllaurate, 750 g. of sodiumligninosulphonate and 3 kg. of kieselguhr was mixed with 10 litres of water and then dispersed while stirring, in water to a total volume of 1000 litres. The resultant aqueous dispersion of the wettable was sprayed on an agricultural field of 1 hectar. It was found that the composition used had a satisfactory pre-emergence and post-emergence herbicidal effect on the weeds, seeds and roots in the field treated herewith.

While we have described our invention in connection with specific embodiments and applications, other modifications thereof will be readily apparent to those skilled in this art without departing from the spirit and scope of the invention as defined in the appended claims.

What we claim is:

1. A compound selected from the group consisting of a dichlorothiobenzamide of the formulae

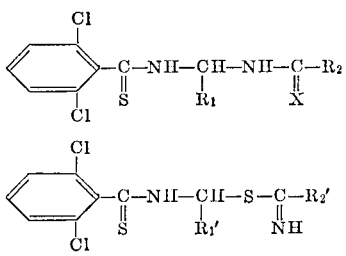

and wherein $R_1$ is selected from the group consisting of hydrogen, phenyl substituted with one to three moieties selected from the group consisting of hydroxy, chlorine and iodine, $R_2$ is selected from the group consisting of methyl and 2,6-dichlorophenyl, X is selected from the group consisting of sulfur and oxygen, $R_1'$ is selected from the group consisting of hydrogen and alkyl of 1–6 carbon atoms and $R_2'$ is selected from the group consisting of 2,6-dichlorophenyl and amino and the salts thereof.

2. A compound of claim 1 wherein $R_1$ is hydrogen.
3. A compound of claim 1 wherein $R_1'$ is hydrogen.
4. A compound of claim 1 wherein $R_1'$ is alkyl of 1–6 carbon atoms and $R_2'$ is 2,6-dichlorophenyl.
5. A compound of claim 1 wherein X is sulfur, $R_1$ is phenyl substituted with one to three moieties selected from the group consisting of hydroxy, chlorine and iodine and $R_2$ is 2,6-dichlorophenyl.
6. A compound of claim 1 wherein $R_2$ is phenyl substituted with iodine or chlorine.
7. A compound of claim 5 wherein $R_2$ is phenyl substituted with chlorine.

8. A hydrochloric acid salt of a compound of claim 1.
9. A compound of claim 1 said compound being

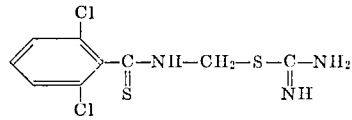

10. A compound of claim 1 said compound being

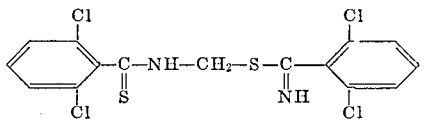

11. A compound of claim 1 said compound being

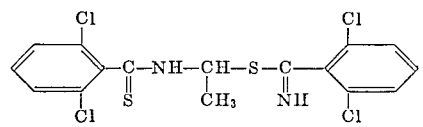

12. A compound of claim 1 said compound being

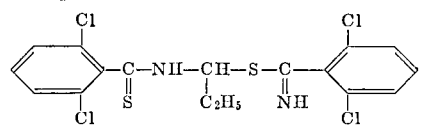

13. A compound of claim 1 said compound being

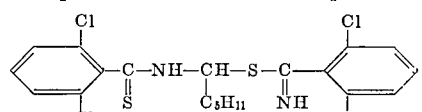

14. A compound of claim 1 said compound being

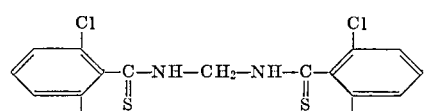

15. A compound of claim 1 said compound being

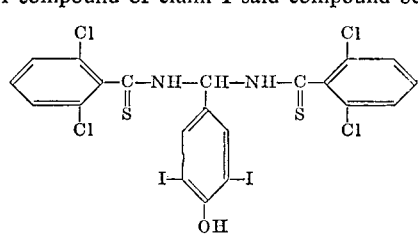

16. A compound of claim 1 said compound being

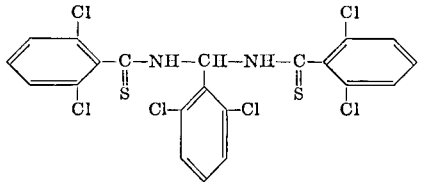

References Cited

UNITED STATES PATENTS 3,424,723   1/1969   Yates _____ 260—551

HENRY R. JILES, Primary Examiner

H. T. MOATZ, Assistant Examiner

U.S. Cl. X.R.

71—92, 93, 94, 95, 100; 260—465, 558, 562

UNITED STATES PATENT OFFICE
CERTIFICATE OF CORRECTION

Patent No. 3,541,145 (PHN 2022)    Dated    November 17, 1971

Inventor(s) JAN JOHANNES VAN DAALEN ET AL

It is certified that error appears in the above-identified patent and that said Letters Patent are hereby corrected as shown below:

Column 9, the first line of the formula should read:

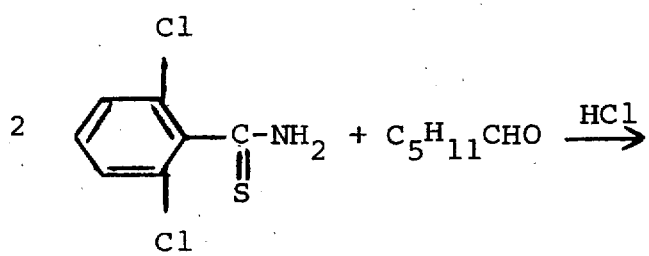

Column 10, Example 10, second line of formula should read

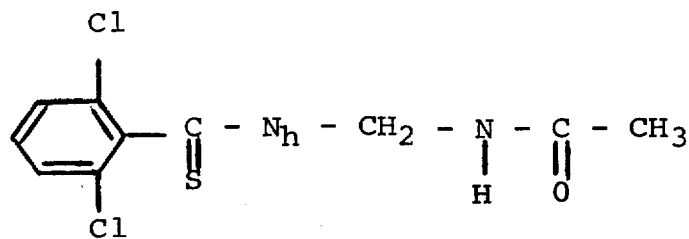

Signed and sealed this 6th day of July 1971.

(SEAL)
Attest:

EDWARD M. FLETCHER, JR.
Attesting Officer

WILLIAM E. SCHUYLER
Commissioner of Pat